US009644959B2

(12) United States Patent
Stephens

(10) Patent No.: US 9,644,959 B2
(45) Date of Patent: May 9, 2017

(54) DATA FUSION ARCHITECTURE

(71) Applicant: GE ENERGY POWER CONVERSION TECHNOLOGY LTD., Warwickshire (GB)

(72) Inventor: Richard Ian Stephens, Warwickshire (GB)

(73) Assignee: GE Energy Power Conversion Technology LTD. (GB)

( * ) Notice: Subject to any disclaimer, the term of this patent is extended or adjusted under 35 U.S.C. 154(b) by 964 days.

(21) Appl. No.: 13/921,418

(22) Filed: Jun. 19, 2013

(65) Prior Publication Data

US 2013/0346017 A1     Dec. 26, 2013

(30) Foreign Application Priority Data

Jun. 22, 2012   (EP) .................................... 12173110

(51) Int. Cl.
 *G01C 21/10*     (2006.01)
 *G01B 21/16*     (2006.01)
 (Continued)

(52) U.S. Cl.
 CPC ............. *G01B 21/16* (2013.01); *G01C 21/16* (2013.01); *G01C 21/20* (2013.01); *G01C 21/28* (2013.01); *G01S 19/48* (2013.01); *B63H 25/04* (2013.01)

(58) Field of Classification Search
 USPC .......................................... 701/472, 500, 512
 See application file for complete search history.

(56) References Cited

U.S. PATENT DOCUMENTS

2012/0136573 A1*  5/2012  Janardhanan ........ G01C 21/165
                                                        701/512

FOREIGN PATENT DOCUMENTS

EP          2161542 A1     3/2010

* cited by examiner

*Primary Examiner* — Lam Nguyen
(74) *Attorney, Agent, or Firm* — Wood IP LLC

(57) ABSTRACT

A data fusion architecture with a plurality of sensors, optionally position measuring equipment (PMEs), is described. Each sensor supplies measurement data $x_1, x_2 \ldots x_M$ and is associated with accuracy data $H_1, H_2 \ldots H_M$ indicative of the accuracy of the supplied measurement data. Sub-processing units derives first estimates $sf_1, sf_2 \ldots sf_M$ and second estimates $Hn_1, Hn_2 \ldots Hn_M$ of the variability of the measurement data supplied by the respective sensor. The first estimates are derived by processing the measurement data $x_1, x_2 \ldots x_M$ and the second estimates are derived by processing the accuracy data $H_1, H_2 \ldots H_M$. The first and second estimates are combined in a multiplier to derive overall estimates $\sigma_1, \sigma_2 \ldots \sigma_M$ of the variability of the measurement data supplied by the respective sensor. Data fusion means such as a Kalman filter combines the measurement data supplied by each sensor and the overall estimates $\sigma_1, \sigma_2 \ldots \sigma_M$ for each sensor.

14 Claims, 2 Drawing Sheets

(51) Int. Cl.
*G01C 21/16* (2006.01)
*G01C 21/20* (2006.01)
*G01C 21/28* (2006.01)
*G01S 19/48* (2010.01)
 B63H 25/04  (2006.01)

DATA FUSION ARCHITECTURE

FIELD OF THE INVENTION

The invention relates to an architecture for data fusion, i.e. the combining of data or measurements from two or more sources. The architecture can be used as part of any system which requires the combination of data from a plurality of sensors, including a dynamic positioning (DP) system for marine vessels where thrusters are used to maintain the position of a vessel in the vicinity of a reference point and stabilise its heading, in opposition to environmental forces such as wind and current.

The term "marine vessels" is intended to include ships, drilling rigs and any other surface-going vessels or platforms or submersible (submarine) vessels.

BACKGROUND OF THE INVENTION

The fundamental components of a dynamic positioning (DP) system are: one or more position reference systems to measure the vessel position and heading; thrusters to apply control action; and a controller to determine the required thrusts. The object of a DP system is not to hold the vessel absolutely stationary, but to maintain its station within acceptable limits. The magnitude of the permitted position variation is dependent upon the application and on operational concerns. In many applications a loss of position beyond the acceptable limits may have a severe impact either on the safety of personnel or equipment, or on the environment. It is vital, therefore, that adequate measures are taken to maintain the integrity of the DP system as far as is reasonably possible.

The DP system combines all available measurements of position, from whatever source, into a single estimate of vessel position. The process of combining the available measurements can be referred to as 'data fusion'.

The sources of measurements can include a wide variety of position measurement equipment (PME) such as gyro-compasses (which offer compact, reliable and accurate measurement of vessel heading (yaw), independent of outside disturbances), taut wires, satellite navigation systems (which include global positioning systems (GPS) and differential GPS (DGPS)), inertial navigation systems (INS), and hydro-acoustic positioning systems.

Different PME typically provide different accuracy of measurement data. The main difference is the level of noise on the measurement data. For example, a DGPS system might provide position measurements with noise of 0.3 m standard deviation, whereas a hydro-acoustic positioning system might provide position measurements with noise of 5 m standard deviation. Because the DP system will normally need to use all of the available measurement data for redundancy purposes it must carry out a data fusion process. Typically the data fusion process will use some form of weighting based on the accuracy of the measurement data provided by each PME. This ensures that a PME that provides lower quality measurement data (i.e. a noisy PME) will have less of an effect on the position estimate derived by the data fusion process than a PME that provides higher quality measurement data.

The accuracy of the measurement data provided by a particular PME may not always be constant. For example, the noise on the position measurements provided by a DGPS will depend on the number and spread of satellites that are visible to the receiver at any particular time. The noise on the position measurements provided by a hydro-acoustic positioning system will depend on the water depth and the number of transponders deployed on the seabed. Known DP systems therefore maintain an estimate of the accuracy of the measurement data provided by each PME in order to determine the relative weightings for the data fusion process. This accuracy estimate is typically calculated using measurement data collected over a period of a minute or more. Because it relies on previous position measurements, the accuracy estimate is slow to respond to sudden changes in the behaviour of the PME, e.g. when the receiver of a DPGS system loses sight of a number of satellites due to shading.

SUMMARY OF THE INVENTION

The present invention provides an improved architecture comprising:
  a plurality of sensors, each sensor supplying measurement data and being associated with accuracy data indicative of the accuracy of the supplied measurement data;
  each sensor being associated with means for deriving first estimates of the variability of the measurement data supplied by the respective sensor by processing the measurement data supplied by the respective sensor, means for deriving second estimates of the variability of the measurement data supplied by the respective sensor by processing the accuracy data associated with the respective sensor, and means for combining the first and second estimates to derive overall estimates of the variability of the measurement data supplied by the respective sensor; and
  means for combining the measurement data supplied by each sensor and the overall estimates for each sensor, e.g. in a data fusion process.

As described in more detail below, the overall estimates for each sensor are used by the combining means to determine the relative weighting given to the measurement data provided by each sensor, i.e. as part of the data fusion process.

Each sensor will typically provide individual measurements at a particular update interval, e.g. one measurement per second. The measurement data is typically provided to a processing unit by cables, often using a serial link between the processing unit and a measurement unit that includes the various sensors. The processing unit will run software that is used to derive the overall estimates. The processing unit will typically derive the overall estimates at its own update interval which is determined by the software. In other words, the overall estimates are derived as a function of time and are typically used in the data fusion process at the same update interval. Often the measurement unit update interval (i.e. the update interval of the sensors) and the update interval of the processing unit will be the same, but they can also be different. The processing unit may use stored measurement data, i.e. previous measurements that have been supplied to the processing unit and stored in a buffer, as well as the most recent measurement that has been supplied by the respective sensor.

Accuracy data can also be provided at a particular update interval. The accuracy data that is indicative of the accuracy of the measurements can be supplied directly by the respective sensor or by other means. For example, the accuracy data can be supplied by a sensor that is different to the sensor that supplies the measurement data but which can provide an indication of certain environmental conditions which might affect the noise on the measurement data.

The data fusion process can combine different types of measurement data. For example, a Kalman filter can be used to combine measurements of velocity and position. The proposed architecture might therefore use sensors that provide different types of measurement data.

One or more of the sensors can be position measuring equipment (PME). The architecture is suitable for use with a wide range of PME including inter alia hydro-acoustic positioning systems providing long baseline (LBL) position measurements and/or ultra-short baseline (USBL) position measurements, satellite navigation systems providing GPS or differential GPS (DGPS) position measurement, laser-based systems, radio-based systems, radar-based systems, mechanical systems (taut-wire) etc. The position measurements provided by the PME might be in latitude/longitude, northing/casting, range/bearing or any other suitable format. The architecture can use a combination of different types of PME (or other sensors) and different position measurement data formats.

The architecture can form part of a larger system that uses the output of the data fusion process. For example, the architecture can form part of a dynamic positioning (DP) system for a marine vessel where the output of the data fusion process is used to control thrusters to maintain the position of the marine vessel in the vicinity of a reference point and stabilise its heading, in opposition to environmental forces such as wind and current. The architecture can form part of a navigation system, optionally for use on aircraft, where positions in three dimensions (latitude, longitude and altitude) and attitude in three axes (pitch, roll and yaw) can be provided by different sensors, e.g. GPS, inertial navigation systems and gyrocompass. The architecture can form part of a measuring system, optionally for measuring liquid levels within a tank onboard a marine vessel, where measurements might be provided by different sensors, e.g. pressure sensors and ultrasonic sensors.

First Estimates of Variability

The means for deriving the first estimates can, for example, calculate the standard deviation of a series of measurements supplied by the respective sensor. In other words, the variability of the measurement data can be estimated in terms of its standard deviation, which, it will be readily appreciated, provides an indication of how the individual measurements deviate from the mean.

The means for deriving the first estimates can be implemented as a function block of the processing unit. First estimates of the variability of the measurement data can be generated by the function block at the update interval of the processing unit.

Previous measurements provided by each sensor can be stored or saved in a buffer before being processed by the function block.

For a sensor i that provides measurements at regular update intervals δ seconds apart then, at time t, the standard deviation $s_i(t)$ of the last N measurements $x_i(t) \ldots x_i(t-(N-1)\delta)$ can be calculated using the following standard equation:

$$s_i = \sqrt{\frac{\sum_{k=0}^{N-1}(x_i(t-k\delta) - m_i(t))^2}{N-1}} \quad (EQ1)$$

where $m_i(t)$ is the mean of the last N measurements:

$$m_i = \frac{\sum_{k=0}^{N-1} x_i(t-k\delta)}{N} \quad (EQ2)$$

N might be any value greater than 1 and will depend on how quickly the estimate is required to change. Larger values of N reduce the variability of the first estimates $s_i(t)$ but increase the time for the first estimates to react to changes in the noise on the measurements supplied by the respective sensor i.

Other equations can also be used. For example, the equation for deriving the first estimates might remove outliers (i.e. a measurement which deviates markedly from other measurements) or eliminate other factors such as the motion of a marine vessel as described in more detail below.

One way of removing such outliers is to calculate the standard deviation in a two-step process. Initially, a first buffer is used to store the last N' measurements. The first process uses equation EQ1 to derive a first standard deviation $s'_i(t)$ and equation EQ2 to derive a first mean $m'_i(t)$ from all the measurements in the first buffer. All of the measurements in the first buffer are then compared to the first mean $m'_i(t)$ and any which differ from this by less than a given multiple g of the first standard deviation $s'_i(t)$ are copied to a second buffer. A second standard deviation $s_i(t)$ that is used as the first estimate of the variability of the measurement data is then derived in a second process from the measurements in the second buffer, whose length is N where N is less than or equal to N'. In this way, the second buffer includes only those measurements which satisfy the inequality:

$|x_i(t-k\delta) - m_i'(t)| \leq g s_i'(t)$

To remove the low frequency motion of a marine vessel, for example, the measurements supplied by the respective sensor can be passed through a high-pass filter which has no effect on high frequency variations. The filtered measurements can then be stored in the buffer and processed by the function block. For a DP system then the breakpoint frequency of such a high-pass filter might be about 0.1 rad/s.

If the architecture is to be used with a DP system then the function block will typically derive estimates of the variability of position measurements in the horizontal plane. For example, the first estimates might be the standard deviation of position measurements supplied by respective PME in two axes such as latitude and longitude, north and east directions, or range and bearing, or the size and orientation of an error ellipse for the position measurements.

Each sensor can be further associated with means for deriving a filtered version of the first estimates of the variability of the measurement data. Such means can be implemented in any suitable form within the processing unit, e.g. a low-pass filter. In the case of equations EQ1 and EQ2 above then the means for deriving a filtered version of the first estimates for sensor i would provide a filtered version $sf_i$ of the standard deviations $s_i$.

Second Estimates of Variability

The architecture requires that each sensor i provides accuracy data $H_i$ indicative of the accuracy of the measurement data that it supplies, or that the accuracy of the measurement data provided by each sensor can be inferred from, or provided by, other means. Many sensors are capable of providing accuracy data directly. For example, the marine-standard NMEA (National Marine Electronics Association) message for GPS positions designated GGA includes data on the horizontal dilution of precision (HDOP)

which is an indication of the effect of the prevailing satellite geometry on the accuracy of the fix. The NMEA standard LBP message for long baseline hydro-acoustic positioning systems includes data for error ellipse major axis, minor axis and orientation. Accuracy data can also be inferred from other means, including measurements provided by other sensors. For example, if the architecture forms part of a measuring system for measuring liquid levels within a tank onboard a marine vessel then the accuracy of the measurements will be reduced when the marine vessel is in rough seas and its motion causes the liquid to slosh about within the tank. In this case, an indication of the accuracy of the measurement data can be inferred from separate measurements of the attitude (pitch and roll) of the marine vessel. In other words, measurements of the attitude of the marine vessel provided by other sensors can be used as the accuracy data for the measuring system, optionally after pre-processing or filtering has been applied.

The fast-acting accuracy data enables the architecture to derive second estimates that take into account any sudden changes in the accuracy or quality of the measurement data being supplied by each sensor. However, it will be readily appreciated that the architecture also takes account of longer term changes in accuracy by using the measurement data to derive the first estimates as described above.

The accuracy data $H_i$ cannot be used directly to determine the relative weighting given to the measurement data supplied by each sensor because the values of the accuracy data are often based on different units, which are not always known to the end-user. For example, the HDOP data has no units and is based on the geometry of the visible satellites whereas the error ellipse is sometimes expressed as a 1-sigma ellipse and sometimes as a 2-sigma ellipse. This means that the accuracy data needs to be 'normalised'.

The means for deriving the second estimates can be implemented within the processing unit. Second estimates of the variability of the measurement data can be generated at the update interval of the processing unit.

The means for deriving the second estimates can include means for deriving a filtered version $Hf_i$ of the accuracy data and means for dividing the accuracy data (i.e. the unfiltered accuracy data $H_i$) by the filtered version of the accuracy data to derive the second estimates $Hn_i$. The second estimates $Hn_i$ can therefore be considered as a normalised, filtered version of the accuracy data associated with the respective sensor.

The means for deriving a filtered version $Hf_i$ of the accuracy data can be implemented in any suitable form within the processing unit, e.g. a low-pass filter.

For a sensor i that provides accuracy data $H_i$ then, at time t, the second estimates can be calculated using the following equation:

$$Hn_i(t) = \frac{H_i(t)}{Hf_i(t)}$$

In one arrangement, the low-pass filters that are used to derive the filtered version of the first estimates and to derive the second estimates can have substantially the same filter characteristics including order, time constant etc.

If the value of the accuracy data does not change between update intervals then the output of the means for deriving the second estimate is 1. If the value of the accuracy data increases suddenly (indicating that the accuracy of the measurement data has suddenly deteriorated for some reason) then the output similarly increases suddenly and slowly reduces back to 1 at a rate determined by the characteristics of the low-pass filter assuming there are no further changes. This is described in more detail below with reference to FIG. 2.

Overall Estimates of Variability

The overall estimates $\sigma_i$ are obtained by multiplying the first and second estimates derived for the respective sensor and are provided in units that are suitable for use in the data fusion process, but which take into account the up-to-date accuracy data that is associated with the sensors.

For a sensor i then, at time t, the overall estimates can be calculated using the following equation:

$$\sigma_i(t) = s_i(t) \times Hn_i(t)$$

or $$\sigma_i(t) = sf_i(t) \times Hn_i(t)$$

depending on whether the first estimates are subsequently filtered.

Data Fusion Process

The combining means can use any suitable data fusion techniques. For example, the combining means can be a Kalman filter or other suitable algorithm, or it can use a weighted average technique.

In the case of a Kalman filter, the overall estimates $\sigma_i$ are used to populate a standard measurement noise covariance matrix by converting standard deviations to variances (i.e. variance=standard deviation squared).

In the case where the combining means uses a weighted average technique then for measurement data in one dimension $x_i$ provided by M sensors, where i=1 . . . M, the weighted average $\bar{x}$ derived by the combining means at time t is given by:

$$\bar{x}(t) = \sum_{i=1}^{M} w_i(t) x_i(t) \qquad (EQ3)$$

and where the relative weightings are given by:

$$w_i(t) = \frac{1/\sigma_i^2(t)}{\sum_{i=1}^{M} 1/\sigma_i^2(t)} \qquad (EQ4)$$

In the case where the measurement data is position measurements provided in two dimensions (e.g. for the horizontal plane), the equations need to change to incorporate different overall variability estimates on each axis, but must also reflect the correlation between axes. Each position measurement is now a vector, $X_i = [N_i E_i]^T$ (e.g. north and east directions) with overall variability estimates on each axis $\sigma_{iN}$ and $\sigma_{iE}$ and the weighted average $\bar{X}$ derived by the combining means at time t is:

$$\bar{X}(t) = \sum_{i=1}^{M} W_i(t) X_i(t) \qquad (EQ5)$$

where $W_i$ are 2×2 weighting matrices given by:

$$W_i(t) = \left[\sum_{i=1}^{M} V_i^{-1}(t)\right]^{-1} V_i^{-1}(t) \quad \text{(EQ6)}$$

in which $V_i$ is the covariance matrix given by:

$$V_i(t) = \begin{bmatrix} \sigma_{iN}^2(t) & \sigma_{iNE}(t) \\ \sigma_{iNE}(t) & \sigma_{iE}^2(t) \end{bmatrix}$$

$\sigma_{iNE}$ is the covariance of the measurements on the two axes, which gives an indication of the correlation of the noise on the two axes. It is not affected by the present invention.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
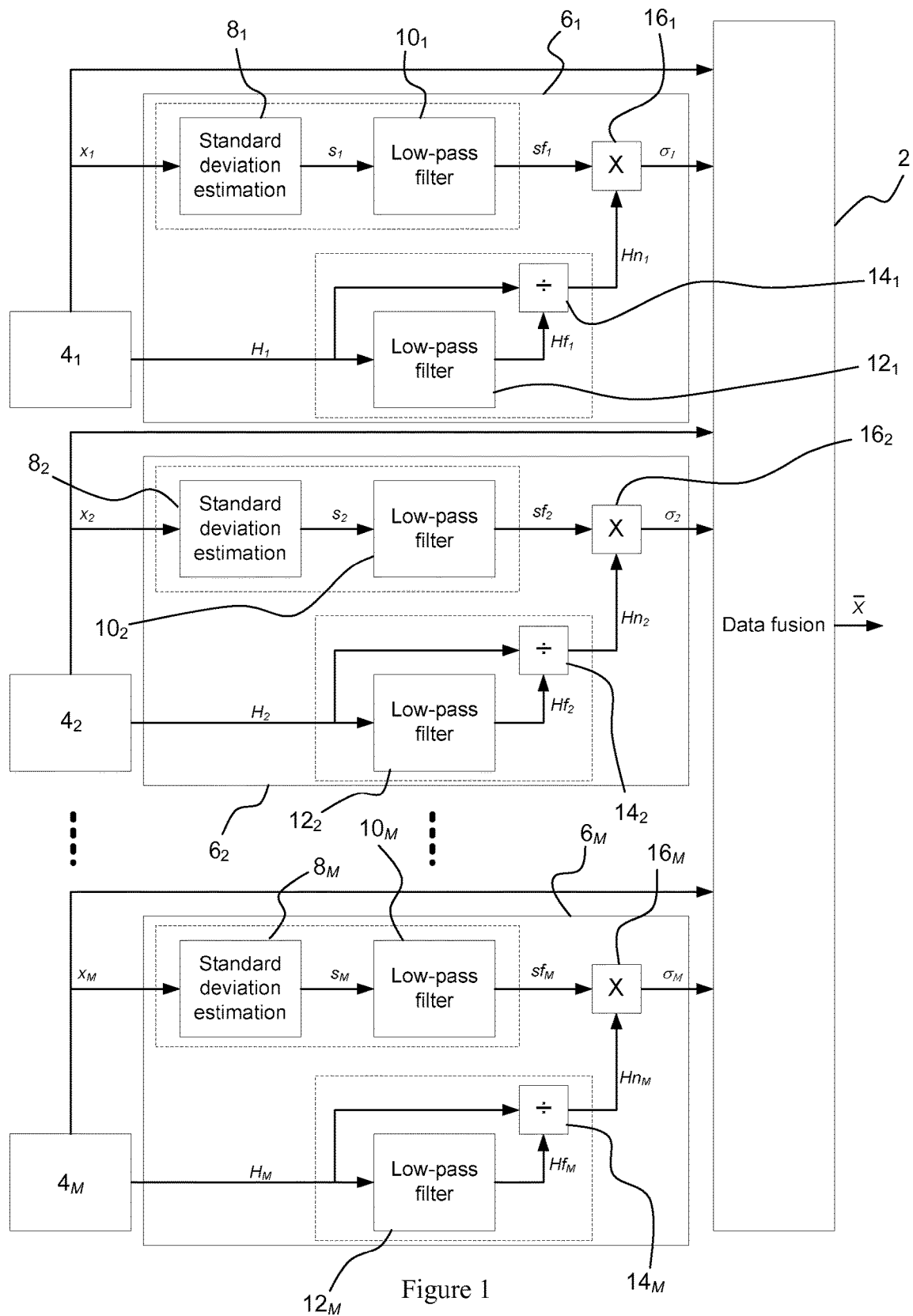
FIG. 1 is a block diagram of an architecture according to the present invention.

An improved architecture for a dynamic positioning (DP) system for a marine vessel will now be explained with reference to FIG. 1.

A DP system includes a Kalman filter 2 (labelled 'Data fusion') to combine position measurements to derive an estimate of the position and heading of the marine vessel. The output $\overline{X}$ of the Kalman filter 2 is supplied to a vessel control unit (not shown) that outputs a signal to thrusters to cause them to bring the position of the vessel closer to a desired reference position.

The position measurements are supplied by a plurality of sensors $4_1, 4_2 \ldots 4_M$ (where M≥2) or position measuring equipment (PME) located on the marine vessel. The sensors $4_1, 4_2 \ldots 4_M$ can be of the same or of different types including inter alia hydro-acoustic positioning systems providing long baseline (LBL) position measurements and/or ultra-short baseline (USBL) position measurements, satellite navigation systems providing GPS or differential GPS (DGPS) position measurement, laser-based systems, radio-based systems, radar-based systems, mechanical systems (taut-wire) etc.

Each sensor $4_1, 4_2 \ldots 4_M$ provides a series of position measurements in two dimensions, e.g. in latitude/longitude, northing/easting, range/bearing or any other suitable format. The position measurements are provided at regular update intervals δ seconds apart. As shown in FIG. 1, the Kalman filter 2 receives position measurements $x_1, x_2 \ldots x_M$ from each sensor which are combined together to derive a position estimate $\overline{X}$ in the form of a vector.

The Kalman filter 2 also receives overall estimates $\sigma_1, \sigma_2 \ldots \sigma_M$ of the variability of the position measurements $x_1, x_2 \ldots x_M$ and which are also used in the data fusion process to derive the position estimate $\overline{X}$.

The way in which overall estimates $\sigma_1, \sigma_2 \ldots \sigma_M$ are derived will now be described in more detail.

The architecture includes a processing unit which includes a series of sub-processing units $6_1, 6_2 \ldots 6_M$. It can be seen that each sensor is associated with its own sub-processing unit. In other words, a first sensor $4_1$ is associated with a first sub-processing unit $6_1$ that derives first overall estimates $\sigma_1$ for the first sensor, a second sensor $4_2$ is associated with a second sub-processor that derives second overall estimates $\sigma_2$ for the second sensor, and so on.

The processing unit derives the overall estimates $\sigma_1, \sigma_2 \ldots \sigma_M$ at its own update interval which is determined by the software that implements the architecture.

Each sub-processing unit $6_1, 6_2 \ldots 6_M$ includes a function block $8_1, 8_2 \ldots 8_M$ (labelled 'Standard deviation estimation') which derives first estimates $s_1, s_2 \ldots s_M$ and a first-order low-pass filter $10_1, 10_2 \ldots 10_M$ (labelled 'Low-pass filter') which filters the first estimates to derive a filtered version $sf_1, sf_2 \ldots sf_M$.

Each sub-processing unit $6_1, 6_2 \ldots 6_M$ also includes a first-order low pass filter $12_1, 12_2 \ldots 12_M$ which derives a filtered version $Hf_1, Hf_2 \ldots Hf_M$ of accuracy data $H_1, H_2 \ldots H_M$ provided by the respective sensor $4_1, 4_2 \ldots 4_M$. The filtered version $Hf_1, Hf_2 \ldots Hf_M$ of the accuracy data is then normalised by a divider $14_1, 14_2 \ldots 14_M$ which provides a normalised version $Hn_1, Hn_2 \ldots Hn_M$.

The normalised version $Hn_1, Hn_2 \ldots Hn_M$ of the accuracy data is then multiplied by the filtered version of the first estimates $sf_1, sf_2 \ldots sf_M$ within a multiplier $16_1, 16_2 \ldots 16_M$ to derive the overall estimates $\sigma_1, \sigma_2 \ldots \sigma_M$ for the respective sensors. It will be readily appreciated that the sub-processing units $6_1, 6_2 \ldots 6_M$ run in parallel with each deriving overall estimates based on the position measurements and the accuracy data that is supplied by the associated sensor.

The operation of one sub-processing unit $6_1$ will now be described in more detail.

The associated sensor $4_1$ provides a series of position measurements $x_1$ as a function of time (i.e. at a regular update interval) to the function block $8_1$ which calculates a series of standard deviation $s_1$ using N stored position measurements, e.g. using equations EQ1 and EQ2. The standard deviations $s_1$ calculated by the function block $8_1$ are then filtered by the first-order low-pass filter $10_1$ to derive filtered versions $sf_1$ of the standard deviations $s_1$. The long-term weighting for each sensor $4_1, 4_2 \ldots 4_M$ is therefore still based on the variability of the position measurements that it provides.

The sensor $4_1$ also provides a series of accuracy data $H_1$ indicative of the accuracy of the series of position measurements $x_1$. The series of accuracy data $H_1$ is provided to the first-order low-pass filter $12_1$ which derives a filtered version $Hf_1$ of the accuracy data. The divider $14_1$ is then used to divide the unfiltered accuracy data $H_1$ by the filtered version of the accuracy data $Hf_1$ to derive second variability estimates $Hn_1$. The standard deviations $s_1$ (i.e. the first estimates of the variability of the position measurements $x_1$) and the second estimates $Hn_1$ of the variability of the position measurements are multiplied together by the multiplier $16_1$ to derive the series of overall estimates $\sigma_1$ for the sensor $4_1$ as a function of time.

If the value of the accuracy data $H_1$ provided by the sensor $4_1$ does not change then the output of the divider $14_1$ is 1. If the value of the accuracy data $H_1$ doubles suddenly then the output of the divider $14_1$ also doubles and slowly reduces back to 1 at a rate determined by the characteristics of the low-pass filter $12_1$.

Figure 2:
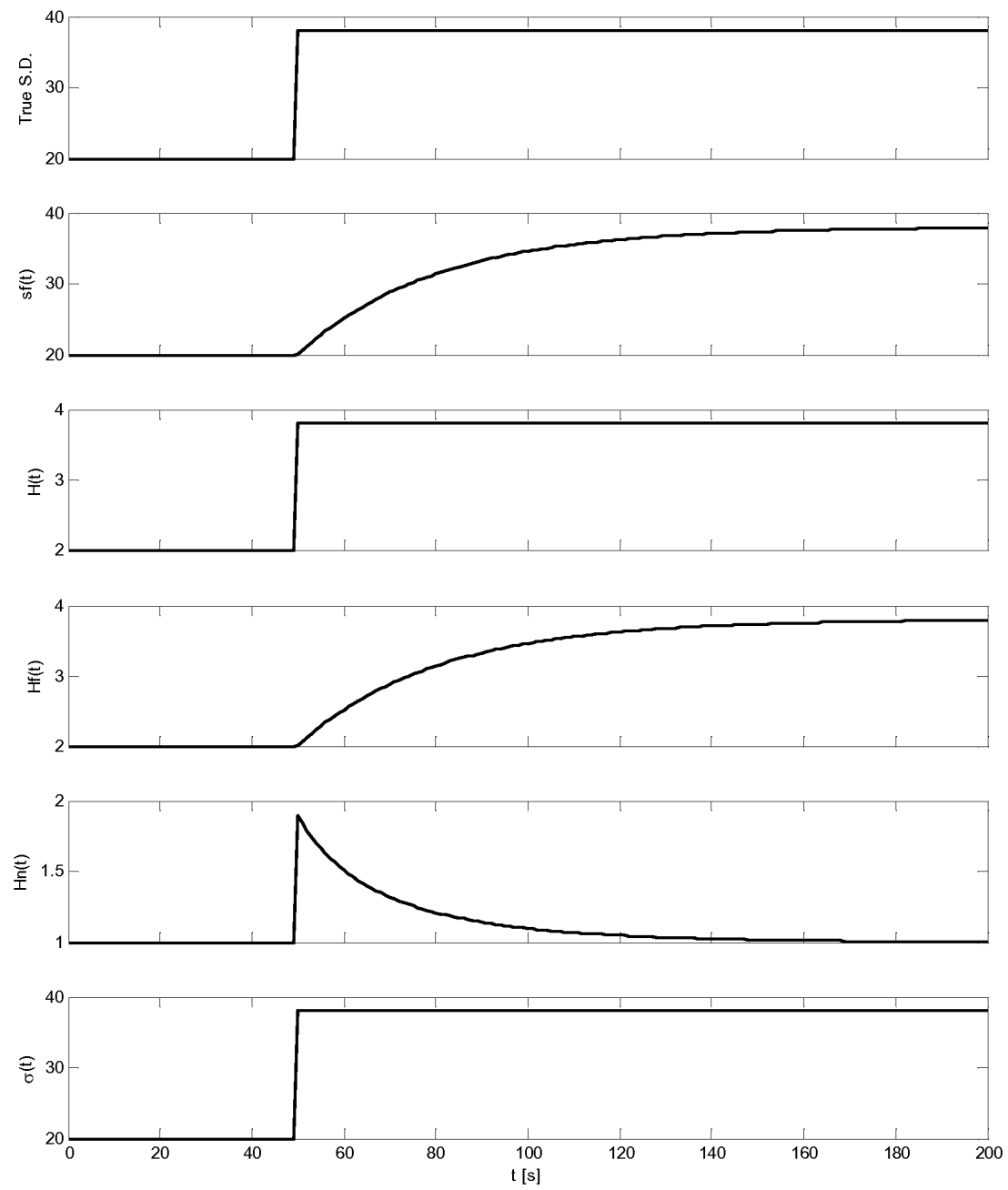
FIG. 2 is a series of plots showing how the architecture internal signals vary over time.

With reference to FIG. 2 then at the start of the plots the true standard deviation of the sensor $4_1$ is 20 meters and the value of the accuracy data $H_1$ is 2. At time t=50 seconds the true standard deviation of the sensor $4_1$ increases suddenly to 38 meters.

It can be seen that the filtered version of the standard deviation $sf_1$ increases slowly from 20 (t<50 seconds) to 38.

The accuracy data $H_1$ provided by sensor $4_1$ also increases suddenly at t=50 seconds from 2 to 3.8 in line with the sudden increase in the true standard deviation of the sensor. The filtered version $Hf_1$ of the accuracy data increases slowly from 2 (t<50 seconds) to 3.8 while the normalised version $Hn_1$ increases suddenly from 1 to 1.9 and then slowly reduces back to 1 since the accuracy data $H_1$ does not change again.

Finally, the overall estimates $\sigma_1$ for the sensor $4_1$ increases suddenly from 20 (t<50 seconds) to 38 and closely resembles the true standard deviation. It is generally preferable that the response of the low-pass filter $12_1$ is as close as possible to the response of the combination of the standard deviation estimation process and the low-pass filter $10_1$.

What is claimed is:

1. Architecture comprising:
   a plurality of sensors, each sensor supplying measurement data and being associated with accuracy data indicative of the accuracy of the supplied measurement data;
   each sensor being associated with means for deriving first estimates of the variability of the measurement data supplied by the respective sensor by processing the measurement data supplied by the respective sensor, means for deriving second estimates of the variability of the measurement data supplied by the respective sensor by processing the accuracy data associated with the respective sensor, and means for combining the first and second estimates to derive overall estimates of the variability of the measurement data supplied by the respective sensor;
   means for removing measurements which deviate from other measurements of the measurement data prior to deriving the first estimates of the variability of the measurement data supplied by the respective sensor;
   means for combining the measurement data supplied by each sensor and the overall estimates for each sensor.

2. The architecture of claim 1, wherein the plurality of sensors includes a combination of different types of sensors and/or different types of measurement data formats.

3. The architecture of claim 1, wherein the means for deriving the first estimates derives estimates of the variability of the measurement data in the horizontal plane.

4. The architecture of claim 3, wherein the first estimates are the standard deviation of the measurement data supplied by the respective sensor in two axes, or the size and orientation of an error ellipse for the measurement data.

5. The architecture of claim 1, wherein each sensor is further associated with means for deriving a filtered version of the first estimates.

6. The architecture of claim 5, wherein the means for deriving a filtered version of the first estimates is a first low-pass filter.

7. The architecture of claim 6, wherein the means for deriving the second estimates includes a second low-pass filter for deriving a filtered version of the accuracy data associated with the respective sensor and means for dividing the accuracy data by the filtered version of the accuracy data, the first and second low-pass filters having substantially the same filter characteristics.

8. The architecture of claim 1, wherein the means for deriving the second estimates includes means for deriving a filtered version of the accuracy data supplied by the respective sensor and means for dividing the accuracy data by the filtered version of the accuracy data.

9. The architecture of claim 8, wherein the second estimates are a normalised, filtered version of the accuracy data supplied by the respective sensor.

10. The architecture of claim 8, wherein the means for deriving a filtered version of the accuracy data is a second low-pass filter.

11. The architecture of claim 1, wherein the means for combining the measurement data supplied by each sensor and the overall estimates for each sensor is a Kalman filter.

12. The architecture of claim 1, wherein the means for combining the measurement data supplied by each sensor and the overall estimates for each sensor uses a weighted average technique.

13. The architecture of claim 1, wherein the sensors are position measuring equipment.

14. A dynamic positioning system for a marine vessel using architecture comprising:
   a plurality of sensors, each sensor supplying measurement data and being associated with accuracy data indicative of the accuracy of the supplied measurement data;
   each sensor being associated with means for deriving first estimates of the variability of the measurement data supplied by the respective sensor by processing the measurement data supplied by the respective sensor, means for deriving second estimates of the variability of the measurement data supplied by the respective sensor by processing the accuracy data associated with the respective sensor, and means for combining the first and second estimates to derive overall estimates of the variability of the measurement data supplied by the respective sensor;
   means for removing the effects of low frequency motion of the marine vessel on position measurement data provided by the respective sensor before the position measurement data is provided to the means for deriving the first estimates; and
   means for combining the measurement data supplied by each sensor and the overall estimates for each sensor.

* * * * *